Figure 1:
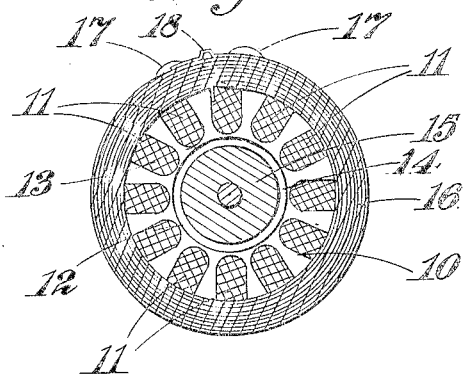

Nov. 24, 1942.    E. B. MOSS    2,303,291

DYNAMO-ELECTRIC MACHINE

Filed Jan. 7, 1942

Inventor.
Eric B. Moss
By
Watson, Cole, Grindle & Watson
Attys.

Patented Nov. 24, 1942

2,303,291

UNITED STATES PATENT OFFICE 2,303,291

DYNAMOELECTRIC MACHINE

Eric Beecroft Moss, London, England, assignor to S. Smith & Sons (Motor Accessories) Limited, Cricklewood, London, England, a British company Application January 7, 1942, Serial No. 425,942
In Great Britain November 4, 1940

4 Claims. (Cl. 171—252)

This invention relates to dynamo electric machines or instruments of the kind having a rotor and a stator, one around the other, of which the outer one, usually the stator, comprises a tubular core having lengthwise slots, not necessarily parallel with the axis of the core, in which slots the conductors of a winding are carried.

In British specification No. 537,833 there is described and claimed a dynamo electric machine or instrument of the kind above referred to wherein the slots for receiving the conductors are open at the exterior wall of the tubular core, the inner wall being uninterrupted by the slots. This construction facilitates the introduction of the winding into the slots.

Further, according to British specification No. 537,833, the slots are closed by a cylinder of magnetic material passed over the core to complete the magnetic path across the ends of the slots. It has been found that this sleeve has to be a very exact fit on the core to avoid air gaps between the sleeve and the core and one object of the present invention is to provide an improved means for closing the slots.

The present invention consists of an improvement in or modification of the dynamo electric machine or instrument claimed in British specification No. 537,833, in which the aforesaid slots are closed by bendable magnetic material wrapped around the core. By wrapping the magnetic material on the core close contact between the wrapping material and the core can be obtained so as to avoid the unrequired air gaps. Preferably, a wire or strip of magnetic material is employed wound around the core in one or more layers.

In a preferred manner of carrying out the invention a strip of low magnetic loss nickel iron alloy, such for example as that known under the trade name "Radiometal" or "Mumetal" is employed. This strip may readily be wound on the core to any desired thickness and in intimate contact with the core so as properly to close the slots. Furthermore, the material may be arranged to overlap the ends of the core to minimise flux leakage and consequent interference with other apparatus.

According to a further feature of the present invention the core comprises both low and high grade magnetic materials so as to obtain magnetic properties between those of the individual materials. The core may, for example, be built up of stampings alternately of low and high grade magnetic materials. The low grade materials are exemplified by commercial silicon-iron alloys and the high grade materials by nickel-iron alloys such as those known under the trade name "Radiometal" and the registered trade-mark "Mumetal."

The following is a description of one form of dynamo electric machine according to this invention, reference being made to the accompanying drawing, in which—

Figure 2:
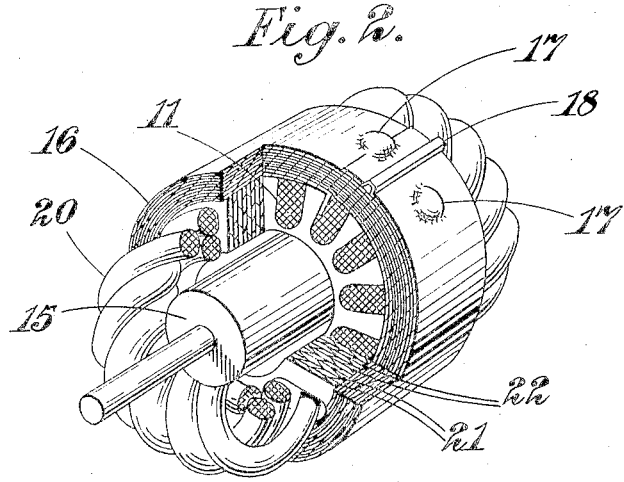

Figure 1 is a section through the machine in a plane transverse to the axis of rotation, and Figure 2 is a perspective view of the motor showing certain parts cut away.

The motor is similar to that described in British specification No. 537,833 in that the stator 10 is provided with slots 11 for the stator coils, which slots extend radially outwards. The slots are open at their outer ends but closed at their inner ends which are separated from the bore 12 for the rotor 15 by a small thickness of metal 13. A gap 14 is provided between the periphery of the rotor and the wall of the bore. In the construction of prior British specification No. 537,833 the outer ends of the slots were closed by a comparatively thick cylinder of magnetic material. This is replaced, in accordance with the present invention, by sheet metal strip 16 which is wound tightly around the stator so as to provide a number of layers and the end of the strip is soldered at 17 to the surface of the layer beneath it. The end of the strip may be bent to provide a locating key 18 which extends across the width of the strip. The stator coils 20 are located in the slot in the manner described in the aforesaid prior British specification.

As will be seen from Figure 2 the core may be built up of laminations 21, 22 comprising both low and high grade magnetic materials, the required shape of the laminations being readily provided by a stamping operation. The width of the strip may be such as to overlap the ends of the stator in order to minimise flux leakage and constant interference with other apparatus. In place of the metal strip there may be employed a wire of magnetic material which is wound helically in a number of layers around the stator.

I claim:

1. An electro-magnetic device comprising a rotor and a stator, one of which parts comprises a tubular core surrounding the other part and having axially extending slots therein opening outwardly for carrying conductors, all of the outer portion of said core between the slots lying in a true cylindrical surface, and a bendable magnetic material wrapped around said core, closing said slots and closely engaging all of said cylindrical surface.

2. An electro-magnetic device comprising a rotor and a stator, one of which parts comprises a tubular core surrounding the other part and having axially extending slots therein opening outwardly for carrying conductors, all of the outer portion of said core between the slots lying in a true cylindrical surface, and a strip of magnetic material wound in a number of layers around said core, closing said slots and having its under layer closely engaging all of said cylindrical surface.

3. An electro-magnetic device comprising a rotor and a stator, one of which parts comprises a tubular core surrounding the other part and having axially extending slots therein opening outwardly for carrying conductors, all of the outer portion of said core between the slots lying in a true cylindrical surface, and a strip of low magnetic loss nickel-iron alloy wound in a number of layers around said core, closing said slots and having its under layer closely engaging all of said cylindrical surface.

4. An electro-magnetic device comprising a rotor and stator, one of which parts comprises a tubular core built up of stampings alternately of low and high grade magnetic materials and surrounding the other part, and having axially extending slots therein opening outwardly for carrying conductors, all of the outer portion of each stamping between the slots lying in the same true cylindrical surface, and bendable magnetic material wrapped around said core, closing said slots and closely engaging all of said cylindrical surface.

ERIC BEECROFT MOSS.